(12) United States Patent
dos Santos

(10) Patent No.: US 7,871,454 B2
(45) Date of Patent: Jan. 18, 2011

(54) CHEMICAL PROCESS FOR RECOVERY OF METALS CONTAINED IN INDUSTRIAL STEELWORKS WASTE

(75) Inventor: José Roberto dos Santos, Paraná (BR)

(73) Assignee: Mineracao Tabipora Ltda., Parana (BR)

( * ) Notice: Subject to any disclaimer, the term of this patent is extended or adjusted under 35 U.S.C. 154(b) by 87 days.

(21) Appl. No.: 12/167,551

(22) Filed: Jul. 3, 2008

(65) Prior Publication Data

US 2009/0272229 A1    Nov. 5, 2009

(30) Foreign Application Priority Data

May 5, 2008    (BR)    .................... 0801716

(51) Int. Cl.
*C22B 7/02*    (2006.01)
*C22B 3/08*    (2006.01)

(52) U.S. Cl. .......................... 75/711; 75/961

(58) Field of Classification Search .................. 75/711, 75/961; 423/150.3, 140, 146
See application file for complete search history.

(56) References Cited

U.S. PATENT DOCUMENTS

| | | | |
|---|---|---|---|
| 3,983,218 A | 9/1976 | Heins | |
| 4,119,455 A | 10/1978 | Cass et al. | |
| 4,355,009 A | 10/1982 | Stewart | |
| 4,614,543 A | 9/1986 | Duyvesteyn et al. | |
| 4,915,730 A | 4/1990 | Elias et al. | |
| 5,286,465 A * | 2/1994 | Zaromb et al. | ............. 423/106 |
| 5,538,532 A | 7/1996 | Keegel, Jr. | |
| 5,961,691 A | 10/1999 | Pinard et al. | |

FOREIGN PATENT DOCUMENTS

WO    WO 94/19501    9/1994

* cited by examiner

*Primary Examiner*—George Wyszomierski
*Assistant Examiner*—Tima M McGuthry-Banks
(74) *Attorney, Agent, or Firm*—Morgan Lewis & Bockius LLP

(57) ABSTRACT

This invention provides chemical processes for the treatment of industrial steelworks waste, especially those from an electric arc furnace, called "flue dust," to allow for the subsequent recovery of metals (e.g. zinc and iron) from the dust. The main purposes of the process are: (i) the opening of the crystalline webs (zinc ferrite) originally formed in the flue dust, with the simultaneous production of soluble sulfates in aqueous medium; (ii) and the destruction of possible dioxins without subsequent regeneration. The processes encompass production of salts or sulfates of the metals in the flue dust, utilizing concentrated sulfuric acid and reagents or catalysts by dry medium, at normal pressure and moderate temperatures. The processes promotes reaction of sulfuric acid with elements found in the flue dust to maintain a homogenous mixture without the presence of water, and prevent agglomeration of the particles through the addition of secondary reagents and catalysts.

6 Claims, No Drawings

CHEMICAL PROCESS FOR RECOVERY OF METALS CONTAINED IN INDUSTRIAL STEELWORKS WASTE

RELATED APPLICATIONS

This application claims the benefit of Brazilian Provisory Application No. 015080001628 filed on May 5, 2008, the disclosure of which is incorporated herein in its entirety.

BACKGROUND OF THE INVENTION

1. Field of the Invention

This invention is directed to a chemical process for the treatment of industrial steelworks waste, especially those from an electric arc furnace, (EAF), called "flue dust", to allow for the subsequent recovery of zinc, iron and other interesting metals contained in the flue dust.

2. Description of Related Art

The zinc has always been used as a protective coating against corrosion on ferrous metals, thus generating the so called "galvanized metal", which, in many cases, substitutes stainless steel items like plates, roofing, screws, and tubes.

Most of the ferrous metals or metal alloy including common iron, carbon steel, alloy steel and cast iron, are recycled several times, creating a recovery cycle of the metal through the reutilization of the scraps as a source of raw material. Thus, all zinc applied in the galvanization of ferrous metals undergoes the same process. However, when these scraps are recycled, the zinc in the scraps is separated from the iron, as a result of the high temperatures in the steelworks furnaces. This separation happens because the melting point of the zinc is lower than that of the iron, so the zinc is volatilized and pulled out of the furnace through the special electrostatic or sleeve filters along with the other dusts from the furnace. This residue is called "flue dust". Since this dust is generated in steelworks that recycle scrap by using electric furnaces, also known as electric arc furnaces, the dust may also be called "electric arc furnace dust"("EAF").

This residue contains average percent values of about 20% of zinc, considered here in the elementary form (Zn) and about 28% of iron, also considered in the elementary form (Fe), combined in a chemical structure know as "zinc ferrite", the formula of the combined oxides is $ZnO.Fe_2O_3$. Besides these, lead (1.5%), chrome (0.25%), cadmium (0.05%), tin (0.15%) and other elements in less contents, such as sulfur, manganese, copper, calcium, magnesium and nickel (generally as oxides) are also found in its composition.

Furthermore, significant amounts of fluorine (F) and chlorine (Cl) are also found in the flue dust. The Chlorine (Cl) comes from the plastics contained in the scraps which are very likely to be combined in carbonic structures called dioxins. Such substances when added to the heavy metals (such as e.g. lead, chromium, and cadmium) classify the flue dust as "dangerous", making its disposal in controlled filling compulsory. This restriction causes the steelworks cost to go up significantly, generating in turn significant amounts of rejects per ton of produced steel, without there being definitive and environmentally correct solutions. Many attempts have been presented for the reuse of the flue dust, however few are economically feasible. Several technical barriers impede the processing of the flue dust. Currently, very few recycling processes have been consolidated in efficiently in the economic and technical perspective. As of late, one of the most well-known and used process is the Waelz Process. This process, nevertheless, requires heavy investments, large production scale, and generates new residues thus, being considered environmentally unsustainable in some countries.

The current status of hydrometallurgical technique for the extraction of metals from ores and industrial residues, acid or alkaline liquid means for dissolution of the oxides, hydroxides, carbonates, silicates and sulfides that contain the interest metal are normally used. The traditional applications of the hydrometallurgy include the production of alumina, gold, uranium, zinc, nickel, copper, molybdenum, titanium, and rare earth, among others.

In the first phase of the hydrometallurgy, the physical-chemical properties of the solid, such as the particles size, composition, content, chemical nature and porosity are adjusted for the next phase, called "the leaching". This first phase consists in an extraction process of a substance from a solid medium by means of its dissolution in an acid or alkaline liquid that reacts chemically with the elements present in the ore or residue, originating a new soluble substance. The hydrometallurgy is greatly used in several fields of science, such as geology, metallurgy, and chemistry. Its preparation involves classical ore treatment operations, like the comminuting or grinding, classification, concentration and the solid-liquid separation.

Once the ore is prepared, the leaching phase begins. These first two phases are the most characteristic phases of the hydrometallurgical flowchart. The leaching makes the selective dissolution of mineral containing the metal or metals of interest, promoting the contact of the solid formed by the concentrate ore or the industrial residue with an aqueous phase containing acids. The acid found here are usually the sulfuric or muriatic acids, bases, like ammonium or sodium hydroxides or complex agents, like sodium cyanide and ammonium hydroxide, with temperatures varying from 25° C. to 95° C. and under varied pressure. This phase is followed by the solid-liquid separation operations, using processes such as cyclone, thickening and filtering, with the purpose of reaching the aqueous or liquor phase that contains the metals of interest. The efficiency of this phase is determined by minimizing the losses of soluble metal in the pulp, which constitutes the waste, and by the consumption of fresh water in the process.

The characteristics of the solids that are being discarded are also determined by the costs of the disposing of the reject and the potential risk of environmental impacts. The treatment phase of the liquor produced in the leaching is designed to purify the solution through the separation of elements coming from the dissolution of the ore or residue that may affect the subsequent phase of the metal's recovery. Secondly, it is designed so that the concentration of the solution containing the dissolved metal reaches adequate levels for the recovery phase which follows. Eventually, this phase may lead to obtaining secondary products.

The treatment of the liquor involves processes such as e.g. precipitation, adsorption in activated coal or in polymeric resins of ionic change and extraction by solvents. The processes employed in this phase may be applied to the treatment of effluents, aiming to concentrate and remove the contaminating elements.

The last phase of the hydrometric flowchart is designed to recover the metal. The metal may be obtained in salt or metallic hydroxide form, as $Al_2O_3.nH_2O$ and $CuSO_4$ (through the precipitation and crystallization processes) or as metallic form. When in metallic form, reaction reduction in aqueous phase is used, such as e.g. cementation, which is the reduction by oxidation of a less noble metal. The reduction by means of hydrogen or the electro recovery is also used, which is the main process used in the production of metals of high purity directly from aqueous solutions. The process comprises the application of a potential difference between cathodes and anodes immersed in aqueous solution and it is used to obtain copper, zinc, nickel and gold, among others. For metals of very negative redox potential, like aluminum, the electro recovery is made in molten salt bath.

However, some difficulties are found for the viability of this process. Several ores or residues present significant resistance to leaching, that is, they are not attacked by the acids or bases even when exposed to high temperatures and high concentrations of leaching agents. For these cases the status of the current technique suggests pretreatment like: (i) the reduction, which consists of the heating of the ores or residues in an environment reducer with temperatures above 1,000° C. with coal, coke or products containing carbon, which are useful for the seizure of the oxygen present in the ores, found as Oxides; (ii) the ustulation, which, in summary, is the heating of ores containing sulfides at temperatures above 600° C. for oxidation of sulfide ores and the liberation of sulfur dioxide; (iii) the pressure leaching, which is the oxidation under pressure and high temperature that may reach up to 250° C.; and (iv) the biohydrometalurgy, which is the biological oxidation of refractory ores by using microorganisms.

This additional treatment makes the costs of equipment and reagents increase significantly, causing many times the technical unfeasibility. Because the flue dust is very refractory to the acid attack and the alkaline attack, a process previous to the leaching is necessary. The most well-known and used around the world nowadays is the two-phased processes called "Waelz". The first phase or pyrometallurgic phase, happens in direct flame rotating kiln. The flue dust previously mixed coke breeze or mineral coal is briquetted and reduced at temperatures around 1,200° C. The next step is the distillation of the zinc which is carried to the electrostatic filters by the exhaust gases and later oxidized, a process also known as "Oxiwaelz". The second phase comprises the removal of the filtered material which goes on to the hydrometallurgical separation and concentration phases until the metallic zinc purified in electrolytic process can be obtained. The other metals form a mass or slag made up of iron and the heavy metals which then go on to fillings or immobilization in Portland Cement Industries. The zinc recovery index in this process is above 93%, however, the process is applied only in large scale due to the heavy implantation and production costs and to the complex number of hydrometallurgical phases, possible dioxins removed by the temperature of the pyrometallurgic phase, which can be regenerated in the cooling, thus maintaining the original problem.

The processes that only use hydrometallurgy for processing the flue dust usually do it with alkaline leaching using sodium hydroxide or ammonia. Nevertheless, the recovery rate of these methods is too low, being in some cases under 50%. Furthermore, the liquid effluents generated in the process must be considered, which have to, in turn, undergo treatments before being discarded.

U.S. Pat. No. 5,538,532 describes a method for the separation and recovery of metals selected from the group consisting of iron, cadmium, zinc, and lead, from raw material comprising a mixture of metals, which comprises the steps of heating the raw material to a temperature sufficient to substantially vaporize cadmium, zinc, and lead, and insufficient to substantially vaporize iron; separating secondary dust and vapors produced during the first step from the residual sinter mass, which mass comprises iron; slurring the secondary dust in an aqueous solution of ammonia ammonium carbonate to dissolve zinc and cadmium; separating a zinc/cadmium bearing leach liquor from substantially insoluble lead containing particles by filtration; treating the zinc/cadmium hearing leach liquor to recover cadmium by adding metallic zinc to the leachate to produce a cadmium containing cement; separating the cement from the leach liquor; and removing ammonia from the leach liquor to precipitate basic zinc carbonate. This method presents a process quite different to the present invention, as it employs high temperatures and, mostly, pyrometallurgy principles.

U.S. Pat. No. 4,614,543 discloses a process for the hydrometallurgical treatment of finely divided iron-containing steel plant dusts containing zinc, lead and such other metal values as calcium, manganese, silicon, magnesium, aluminum, cadmium, copper, and the like. The process is carried out by forming an aqueous slurry of the flue dust with a mixed lixiviant comprising HCl and $H_2SO_4$, the amount of sulfate ion concentration being in excess of the chloride ion concentration and in stoichiometric excess of that required to sulfate substantially all of the lead and calcium present. The amount of chloride ion present as HCl should be sufficient to maintain the pH at about 1 to 4. The leaching is conducted at a temperature ranging from ambient to below the boiling point for a time at least sufficient to effect dissolution of at least zinc and other metal values and form a residue containing iron oxide, calcium sulfate and lead sulfate. The method regards a process characterized by the use of sulfuric acid and some hydrometallurgical operations which are quite different of those presented in this invention.

U.S. Pat. No. 4,915,730 discloses a process and apparatus for the recovery of metals such as silver from phosphate flue dust. The process includes the steps of blending chloride salt and the flue dust to produce a blended material, roasting the blended material in an oxygen bearing atmosphere to oxidize carbon in the blended material producing a gas and to react chloride salt with the metal in the blended material producing a water soluble metallic salt, dissolving the metallic salt in water to produce a solution, filtering the solution to remove solids, and precipitating metals from the filtered solution with the precipitate ready for conventional smelting. The preferred embodiment of the apparatus includes a flue dust hopper and mill and a salt hopper and mill for feeding the dust and salt to a radiant tube dryer and a radiant tube asher for blending and roasting the materials, and a spray chamber at the outlet of the asher for separating solids and gases, where certain of the solids go into solution. The apparatus further includes a filter for removing the undissolved solids, a zinc feeder to add zinc to precipitate the dissolved silver, and a filter for removing the zinc-silver precipitate which is ready for smelting. The methods regards a slightly similar process, as it happens at substantially higher temperatures, employing partial fusion and reactants different from those proposed in this invention.

WO/1994/019501 discloses a process for the treatment of electric arc furnace (EAF) dust, the dust is first subjected to atmospheric leaching with a ferric chloride solution and thereafter subjected to treatment in an autoclave at an elevated temperature and pressure for conversion of low temperature stable goethite (FeO.OH) to a filterable crystalline hematite $(Fe_2O_3)$ in an acidic chloride solution. Zinc is recovered from the solution by solvent extraction using a solvating extractant followed by stripping and zinc recovery by electrolysis of zinc chloride or zinc sulfate solution. Lead is separated from the solution by cooling to precipitate lead chloride. The method regards a process which is quite different from the one proposed here, employing hydrometallurgical means making its operations in liquid medium and with different reagents than those of the present invention.

U.S. Pat. No. 4,355,009 discloses a hydrometallurgical process for separate treatment of zinc-bearing metallurgical flue dust containing significant amounts of lead, chlorine, and iron. The process is especially suited for extraction of zinc sulfate from blast furnace white dust resulting in the smelting of secondary copper. According to the process, the flue dust is leached in sulfuric acid solution for substantially complete dissolution of soluble constituents, notably zinc, leaving insoluble residue consisting principally of lead oxide. At completion of leaching, pH is selectively adjusted corresponding to the desired extent of subsequent chloride removal. Second, the loaded leach solution is treated for chloride removal wherein chloride ion concentration is substantially and selectively reduced by precipitation of cuprous chloride, cuprous ions being provided by pH regulated reduction of cupric ions. Third, the de-chlorinated leach solution is treated by pH regulated cementation with zinc to remove residual cupric copper from the previous step along with other metal impurities more noble than zinc. Fourth, iron is precipitated from the acidic leach solution by oxidation of acid-soluble ferrous ions to the relatively insoluble ferric state. Finally, the purified leach solution is subjected to evaporative crystallization to recover commercial grade zinc sulfate. This method is yet again quite different from the one proposed here, being distinguished only by the fact that it also proposes the formation of soluble salts or sulfates, substantially different from the proposition of the present invention.

U.S. Pat. No. 5,961,691 describes a process for extracting and recovering lead or lead derivatives in high purity from various materials containing lead sulfate, and particularly copper smelter flue dusts. The present process also allows the substantially complete recovery or recycling of precious metals otherwise lost in flue dusts. The method regards a process non-similar to the present invention.

U.S. Pat. No. 3,983,218 describes a process using run-of-the-mill flue dust from open hearth and basic oxygen steel making processes having certain iron-zinc values as a sulfur dioxide absorbent and pollutant control for industrial and public utility furnace flue gases, which materials, upon solid dry injection into a chemical reaction zone of an industrial or public utility furnace in an amount in excess over stoichiometric, results in substantial dry removal of the sulfur dioxide there from, and from which reaction products are cleaned by conventional gas cleaning apparatus. The method regards, then, a process different to the present invention.

U.S. Pat. No. 4,119,455 discloses a method of recovering iron-bearing flue dust collected as a by-product in wet sludge or dry form from metallurgical processes for recycling. The moisture content of the collected flue dust is adjusted to a level at which the wet dust is of a plastic consistency such that it will extrude into cohesive agglomerates (generally 8-16% moisture content). If the dust is collected in a dry state, moisture is added; if collected in a wet state, the moisture content is adjusted by the addition of a complimentary dry material. Hydraulic cement is added to the mixture in the range of approximately 4-15% by weight and the mixture is extruded into cohesive agglomerates and thereafter cured for subsequent charging to metallurgical furnaces. The method proposed remains unique when compared to yet this invention.

What is needed is a recycling process that is economical, technically less complex and optimized for the environmental conditions.

SUMMARY OF THE INVENTION

This invention is directed to a chemical process for the treatment of industrial steelworks waste, especially those from an electric arc furnace, (EAF), called "flue dust", to allow for the subsequent recovery of zinc, iron and other interesting metals from the dust. The main purposes of the process are: (i) the opening of the crystalline webs called zinc ferrite originally formed in the flue dust, with the simultaneous production of soluble sulfates in aqueous medium; (ii) and the destruction of the possible organic chains containing chlorine, the so called dioxins without its subsequent regeneration.

Generically, the process may be summarized as the production of salts or sulfates of the metals constituting the flue dust, utilizing concentrated sulfuric acid and reagents or catalysts by dry medium, at normal pressure and moderate temperatures. It consists in promoting the reaction of concentrated sulfuric acid with the elements found in the flue dust to maintain a homogenous mixture without the presence of water, and preventing the agglomeration of the particles through the addition of secondary reagents and catalysts, in the specific case, the ground solid potassium chlorides.

The invention provides for a recovery process of metals contained in the flue dust by promoting a homogeneous mixture of the flue dust with concentrated sulfuric acid in dry medium, without the agglomeration of the particles. In one embodiment of the invention, the process utilizes solid ground potassium chloride as a chemical reagent and anti-agglutinator. In another embodiment of the invention, the process utilizes the slow addition of the concentrated sulfuric acid as mist with compressed air. In yet another embodiment of the invention, the process is carried out at normal atmospheric pressure. In an alternate embodiment of the invention, the process is carried out at elevated temperature such as e.g. between 150° C. and 250° C. The process may further comprise the recovery of hydrogen chloride resulting from the reactions by means of its absorption in calcium hydroxide. In an alternate embodiment of the invention, the process may result in the recovery of the hydrogen fluoride resulting from the reactions through its absorption in calcium hydroxide. In yet another embodiment of the invention, the process optimally promotes the elimination of organic compounds containing chlorine.

One embodiment of the invention is a method for the recovery of one or more metals from flue dust by contacting flue dust with a composition containing concentrated sulfuric acid in a dry medium, whereby the contacting results in a homogenous mixture of the flue dust without agglomeration. Preferably the method allows for the formation of salts or sulfates of the metals in the flue dust. The method may further comprise the step of subsequently isolating the salts or sulfates of the metals. Optionally, the composition contains solid ground potassium chloride as a chemical reagent and an anti-agglutinator. The step of contacting the flue dust may be carried out by slow addition of the concentrated sulfuric acid as mist with compressed air. The method may be carried out under a variety of conditions. In one embodiment, the method is carried out at normal atmospheric pressure. In another embodiment, the method is carried out at temperatures between 150° C. and 250° C. Optionally, the method may further comprise the step of contacting the flue dust with a composition comprising calcium hydroxide. Such contacting allows for the recovery of hydrogen chloride or hydrogen fluoride. The method is suitable for the recovery of a variety of metals including but not limited to iron, lead, chrome, cadmium, tin, copper, magnesium, and nickel. In a preferred embodiment, the method is used to isolate iron.

Another embodiment of the invention is a method for the recovery of at least iron and/or zinc from flue dust comprising contacting flue dust with a composition comprising concentrated sulfuric acid in a dry medium, whereby the contacting results in a homogenous mixture of the flue dust without agglomeration. Preferably, the methods allows for the formation of salts or sulfates of the metals in the flue dust which may subsequently be isolated. The composition further comprises solid ground potassium chloride as a chemical reagent and an anti-agglutinator. In one embodiment, the step of contacting is carried about by slow addition of the concentrated sulfuric acid as mist with compressed air. The method may be carried out at normal atmospheric pressure and at temperatures between 150° C. and 250° C. In one embodiment of the invention, the method has the additional step of contacting the flue dust with a composition comprising calcium hydroxide. This contacting may allow for the recovery of hydrogen chloride or hydrogen fluoride.

DETAILED DESCRIPTION OF THE INVENTION

The processes according to the invention address the technical, economical, and environmental conditions for the recycling process. The processes can optimally be used in smaller production scale; it reduces the costs and minimizes the impacts on the environment.

Furthermore, in processes according to the invention, the extraction of the zinc in percentages of up to 98% and about 95% for iron, with average mass reduction of 89% on the original mass is attained. All the carbonic chains linked to chlorine, and eventually to fluorine, are also broken down by the energetic reaction that the concentrated sulfuric acid promoted at temperatures above 100° C., chemically depriving the possible dioxins (with the fluorine and chlorine) of being regenerated. In this process the investment costs are greatly reduced making the construction of smaller scale recycling units possible.

The treatment processes according to the instant invention make the recovery of metals contained in the flue dust possible by promoting a slow and homogeneous mixture of the dust with concentrated sulfuric acid at about 98%. This provides for chemical reaction of the acid with the flue dust, without the presence of water and without having agglomeration of the material. It is well-known in the art that any finely divided material under shaking and with progressive addition of liquids tends to agglomerate forming pellets or clots. This makes the dissipation of the temperature and the reagents by the mass impossible for it prevents the chemical reactions in dry medium. That is why, prior to the instant invention, only the hydrometallurgy is used for the processing of salts. According to the present invention, this problem is solved by not allowing this mixture to agglomerate by maintaining temperatures above 100° C. in a dry medium. For such, solid ground potassium chloride is added to the mass which acts as a multifunctional conditioner, participating directly in the chemical reactions and acting as non agglutinant.

The flue dust coming from the steelworks industries is generally presented in granulate form or partially agglomerated as a result of transportation and humidity varying between about 5% and about 8% in mass.

Due to this, the flue dust must first be dried in a rotating indirect flame drier with temperatures varying between 120° C. to 180° C. for the removal of the surplus humidity. The humidity must be about 2% in weight, to make the subsequent processes easier. The grinding or reduction is the next step. This may occur in balls mills until an average particle size of about 40 μm is reached. Once this is done, the flue dust is homogenized, which can be done in an inverted blade mechanic mixer, by adding the previously ground dry potassium chloride with average particle size of 50 μm, in percentages varying between about 5% and about 15% in mass. The heating cycle then begins until the average temperature of about 120° C. is reached. This temperature is ideal to begin the addition of concentrated sulfuric acid. The mixture should be made in a closed reactor with central shaking, provided with forced exhaust and indirect side heating.

Once the load is prepared as described the addition of concentrated sulfuric acid (mist) is made. The sulfuric acid is typically fed through a ventury injector type dosing nozzle, provided with an additional tube for simultaneous injection of compressed air for the mist formation. The sulfuric acid discharges are controlled by the dosing pump and the pneumatic valves are for the compressed air. The chemical reactions of the concentrated sulfuric acid with the flue dust and the reagents that were used (potassium chloride) immediately begin, liberating a great amount of energy which heats all the mass in reaction. With the heating coming from the exothermic chemical reactions, the temperature rises to values near 150° C. Heating is maintained only to keep the temperature between 150° C. and 250° C. This is ideal for the chemical reactions to take place so that the flue dust will open and for the formation of sulfates. The rest of the acid necessary is dosed to complete the opening process and the chemical sulfating reaction. The reactions occur in a cyclical form according to the following generic equations:

(i) Generic reaction of the mixture chlorides, including potassium chloride and the chloride ions of the organic chains present in the flue dust with sulfuric acid forming hydrogen chloride.

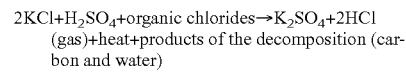
$2KCl+H_2SO_4+\text{organic chlorides} \rightarrow K_2SO_4+2HCl$
(gas)+heat+products of the decomposition (carbon and water)

The potassium chloride and the chloride ions present in the organic chains of the flue dust react energetically with the concentrated sulfuric acid, forming potassium sulfate, and rising hydrogen chloride, and destruction organic compounds containing chlorine. The generated hydrogen chloride reacts immediately with the components of the flue dust according to the following:

(ii) Reaction of the zinc ferrites with the rising hydrogen chloride

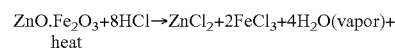
$ZnO.Fe_2O_3+8HCl \rightarrow ZnCl_2+2FeCl_3+4H_2O(vapor)+$ heat

The zinc ferrite reacts with the hydrogen chloride to form zinc and iron chlorides.

(iii) Reaction of the zinc and iron chlorides with sulfuric acid regenerating the rising hydrogen chloride.

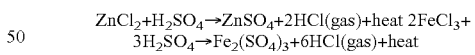
$ZnCl_2+H_2SO_4 \rightarrow ZnSO_4+2HCl(gas)+heat\ 2FeCl_3+$
$3H_2SO_4 \rightarrow Fe_2(SO_4)_3+6HCl(gas)+heat$ The zinc and iron chlorides react with sulfuric acid regenerate the hydrogen chloride which has been withdrawn from the system by exhaustion along with the water vapor. The final product of all the involved reactions is a mixture of sulfates of most of the elements present in the flue dust. All the potassium chloride is also transformed into sulfate. The hydrogen chloride being distilled leaves the reactor through exhaust gases and is recovered in absorption towers in an alkaline solution, preferably of calcium hydroxide. It is then obtained as product from the absorption the calcium chloride ($CaCl_2$) which can be commercialized. Below is the generic reaction of absorption of hydrogen chloride in alkaline medium.

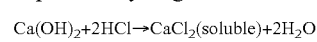
$Ca(OH)_2+2HCl \rightarrow CaCl_2(soluble)+2H_2O$

The calcium hydroxide reacts with the hydrogen chloride forming soluble calcium chloride and water. Potassium hydroxide could also be to obtain the potassium chloride that can be regenerated as a reagent.

For the fluorides ions present in the flue dust the chemical behavior is similar to that of chloride ions, forming the hydrogen fluoride (HF). When the absorption of the gases is made with calcium hydroxide, there is forming of insoluble calcium fluoride is formed and may be easily separated from the highly soluble calcium chloride, according to the following reaction:

$$Ca(OH)_2 + 2HF \rightarrow CaF_2(insoluble) + 2H_2O$$

Most of the sulfates formed in the process are soluble in water, except for the lead and calcium sulfates. Once the reactions have ended the sulfated material is taken from the reactor and transferred to a tank with central shaking and re-pulped with water in the proportion of about 300 kg of sulfated material for each cubic meter of water. The pulp is kept under shaking and heat between 65° C. and 70° C. for 60 min, for the total extraction of the soluble sulfates. Then, the insoluble residue, normally lead and calcium sulfate, magnetite ($Fe_3O_4$), silica and carbon, is decanted and the solution of the soluble sulfates is filtered in press filters.

The insoluble residue is also filtered in press filter and washed several times for extraction of the residual soluble salts from the filtration cake. The final mass of these residues corresponds to about 10% of the initial mass of the flue dust. Essentially, this residual mass has the elements that were not attacked by the sulfuric acid and the insoluble sulfates, like the lead sulfate, calcium sulfate, carbon, iron in the form of magnetite ($F_3O_4$), silica, manganese etc. This final residue goes to a final destination and or co-processing in structural ceramics. It is mixed in the ceramics mass in proportions that vary between about 10% and about 20% in mass. The elements of the residue are combined with the crystalline structures of the ceramics clays formed in high temperature encapsulating the heavy metals and preventing them from being released into the environment. The recycling cycle is then complete.

The sulfates solution, comprising zinc and iron, is submitted to the precipitation phases of the iron and other impurities. The iron is precipitated in acid pH between about 2.0 and about 2.5 and comes out as hydrated oxide (FeO.OH), which can be applied as inorganic pigment. The other soluble elements such as chrome, nickel, copper and manganese, are selectively precipitated in pH between about 3.5 to about 4.5. They are then incorporated to the mass of the final residue. Only a zinc sulfate solution then remains. The diluted and purified zinc sulfate then goes to the concentration and crystallization phases in evaporators which are shaken by direct vapor heating. After this is done the zinc sulfate is dried, ground, packed and stocked pilled.

This invention is not limited to the representation herein commented or illustrated, and must be understood in a broader scope. Many changes and other representations of the invention will come to the mind of those versed in the present technique, benefiting not only of the teaching herein but also from the drawings enclosed. Furthermore, this invention is not limited to the particular disclosed form, changes and other forms are understood to be included in the scope of the enclosed claims. Although specific terms are employed here, they are only used in a generic and descriptive form not intended to be limited.

What is claimed is:

1. A method for the recovery of one or more metals from flue dust, the method comprising contacting flue dust with a composition comprising
   i) concentrated sulfuric acid in a dry medium,
   ii) solid ground potassium chloride as a chemical reagent, and
   iii) an anti-agglutinator,
   wherein said contacting results in a homogenous mixture of the flue dust without agglomeration.

2. The method of claim 1, wherein the step of contacting is carried about by slow addition of the concentrated sulfuric acid as mist with compressed air.

3. The method of claim 1, further comprising the step of contacting the flue dust with a composition comprising calcium hydroxide.

4. A method for the recovery of at least iron and/or zinc from flue dust, the method comprising contacting flue dust with a composition comprising
   i) concentrated sulfuric acid in a dry medium,
   ii) solid ground potassium chloride as a chemical reagent, and
   ii) an anti-agglutinator,
   wherein said contacting results in a homogenous mixture of the flue dust without agglomeration.

5. The method of claim 4, wherein the step of contacting is carried about by slow addition of the concentrated sulfuric acid as mist with compressed air.

6. The method of claim 4, further comprising the step of contacting the flue dust with a composition comprising calcium hydroxide.

* * * * *